US010724582B2

(12) United States Patent
Klaser et al.

(10) Patent No.: US 10,724,582 B2
(45) Date of Patent: Jul. 28, 2020

(54) HYBRID TRANSMISSION HAVING ELECTRO-MAGNETICALLY ACTUATED PAWL CLUTCH

(71) Applicant: Ford Global Technologies, LLC, Dearborn, MI (US)

(72) Inventors: Jacob Klaser, Royal Oak, MI (US); Norman Jerry Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 15/978,314

(22) Filed: May 14, 2018

(65) Prior Publication Data

US 2019/0345991 A1 Nov. 14, 2019

(51) Int. Cl.
  *F16D 27/118* (2006.01)
  *B60K 6/387* (2007.10)
  *F16D 41/12* (2006.01)

(52) U.S. Cl.
  CPC ............ *F16D 27/118* (2013.01); *B60K 6/387* (2013.01); *F16D 41/12* (2013.01)

(58) Field of Classification Search
  CPC ...... F16D 27/118; F16D 27/102; F16D 41/12; B60K 6/387; B60K 6/383
  See application file for complete search history.

(56) References Cited

U.S. PATENT DOCUMENTS

| 1,900,787 | A | 3/1933 | Baugnee |
| 2,866,109 | A | 12/1958 | Watson |
| 3,463,280 | A | 8/1969 | Hoffman et al. |
| 5,931,271 | A | 8/1999 | Haka |
| 5,996,758 | A | 12/1999 | Baxter, Jr. |
| 6,121,705 | A | 9/2000 | Hoong |
| 6,244,965 | B1 | 6/2001 | Klecker et al. |
| 6,854,577 | B2 | 2/2005 | Ruth |
| 7,258,214 | B2 | 8/2007 | Pawley et al. |
| 7,484,605 | B2 | 2/2009 | Pawley et al. |
| 8,403,123 | B2 | 3/2013 | Bird et al. |
| 8,978,838 | B2 | 3/2015 | Bird |
| 9,091,312 | B2 | 7/2015 | Lindemann et al. |
| 9,097,299 | B2 | 8/2015 | Sharp |
| 9,127,730 | B2 | 9/2015 | Greene et al. |
| 2004/0050641 | A1* | 3/2004 | Jin .................. F16D 41/12 192/46 |
| 2009/0152028 | A1 | 6/2009 | Samie et al. |
| 2009/0152058 | A1 | 6/2009 | Samie et al. |
| 2011/0290608 | A1 | 12/2011 | Bird et al. |
| 2012/0122622 | A1 | 5/2012 | Turnbull et al. |
| 2016/0017937 | A1* | 1/2016 | McConnell ......... F16D 41/12 192/45.1 |
| 2016/0091062 | A1 | 3/2016 | Wys et al. |

(Continued)

*Primary Examiner* — Stacey A Fluhart
(74) *Attorney, Agent, or Firm* — David Kelley; Brooks Kushman P.C.

(57) ABSTRACT

An electro-magnetically actuated pawl clutch is adapted to establish a fixed overdrive ratio in a powersplit type hybrid gearing arrangement. In a first embodiment, the pawl clutch holds a member against rotation in one direction when engaged and permits rotation in the other direction. In a second embodiment, the pawl clutch prevents relative rotation between two rotatable members in one direction when engaged and permits relative rotation in the other direction. In either embodiment, the coil is stationary.

18 Claims, 6 Drawing Sheets

(56) References Cited

U.S. PATENT DOCUMENTS

| | | | |
|---|---|---|---|
| 2016/0160941 A1 | 6/2016 | Green et al. | |
| 2018/0022200 A1* | 1/2018 | Trent | B60K 6/387 192/46 |
| 2019/0256077 A1* | 8/2019 | Stoltz | B60H 1/004 |

* cited by examiner

FIG. 6

HYBRID TRANSMISSION HAVING ELECTRO-MAGNETICALLY ACTUATED PAWL CLUTCH

TECHNICAL FIELD

This disclosure relates to the field of vehicle clutches. More particularly, the disclosure pertains to an electro-magnetically actuated pawl clutch used within a hybrid electric powertrain.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Some transmissions, called discrete ratio transmissions, are configured to establish a finite number of speed ratios between an input shaft and an output shaft. When the currently selected ratio is no longer appropriate, a discrete ratio transmission must shift to a different one of the available speed ratios. Other transmissions, called continuously variable transmissions (CVTs), are capable of establishing any speed ratio between lower and upper limits. CVTs are capable of making frequent fine speed ratio adjustments which are not perceivable by vehicle occupants.

Many transmissions use hydraulically actuated friction clutches to establish various power flow paths. Hydraulic actuation is suited for clutches that selectively couple rotating elements to one another because pressurized hydraulic fluid can be routed from a stationary housing to rotating components between seals. Therefore, the hydraulic actuator can rotate with one of the rotating elements. When there are multiple hydraulically actuated clutches, the clutches often share an engine drive pump and share many of the valve body components used to regulate the pressure.

Hybrid vehicle transmissions improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later, allowing the engine to produce less power than instantaneously required for propulsion and thereby consuming less fuel.

SUMMARY OF THE DISCLOSURE

An electro-magnetically actuated clutch includes a toothed plate, a race, a stationary, non-toothed plate, and a stationary coil. The race may be radially outside the toothed plate. The toothed plate may be either stationary or be supported for rotation. The race is supported for rotation relative to the toothed plate. The race includes a plurality of pivotable pawls. A surface of each of the pawls facing the toothed plate may be concave. The stationary, non-toothed plate is separated from the race by an air gap. The stationary coil is configured to establish a magnetic circuit through the stationary plate, the pawls, and the toothed plate thereby attracting the pawls into engagement with the toothed plate to restrain relative rotation. The pawls may prevent relative rotation in one direction but permit relative rotation in an opposite direction. The pawls may remain separated from the stationary, non-toothed plate by the air gap when they pivot into engagement with the toothed plate. A distance separating the stationary, non-toothed plate from the race may remain constant as the pawls pivot. The air gap may separates the stationary, non-toothed plate from the race in a direction parallel to a pivot axis of the pawls.

An electro-magnetically actuated clutch includes a toothed plate, a race, a stationary plate, and a stationary coil. The toothed plate may be either stationary or supported for rotation. The race is supported for rotation relative to the toothed plate and including a plurality of pivotable pawls. The race may be radially outside the toothed plate. A surface of each of the pawls facing the toothed plate may be concave. The stationary plate is separated from the race by a fixed air gap. The stationary coil is configured to establish a magnetic circuit through the stationary plate, the pawls, and the toothed plate to attract the pawls into engagement with the toothed plate to restrain relative rotation. The pawls may prevent relative rotation in one direction but permit relative rotation in an opposite direction.

An electro-magnetically actuated brake includes a stationary inner race, and an outer race supported for rotation about the inner race. The stationary inner race includes a toothed plate, a non-toothed plate, and a coil. The outer race includes a plurality of pawls. The coil is configured to establish a magnetic circuit through the non-toothed plate, the pawls, and the toothed plate to attract the pawls into engagement with the toothed plate to restrain rotation of the outer race. The pawls may engage the toothed plate to prevent relative rotation in one direction but permit relative rotation in an opposite direction. A surface of each of the pawls facing the toothed plate is concave.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to have the same rotational speed about the same axis in all operating conditions. Rotating elements can be fixedly coupled by, for example, spline connections, welding, press fitting, or machining from a common solid. Slight variations in rotational displacement between fixedly coupled elements can occur such as displacement due to lash or shaft compliance. In contrast, two rotating elements are selectively coupled by a shift element when the shift element constrains them to have the same rotational speed about the same axis whenever the shift element is fully engaged and the elements are free to have distinct speeds in at least some other operating condition. Two rotating elements are coupled if they are either fixedly coupled or selectively coupled. Two rotating elements are driveably connected if a series of gears and shafts is capable of transmitting power from one to the other and establishes a fixed speed ratio between the two elements.

Figure 1:
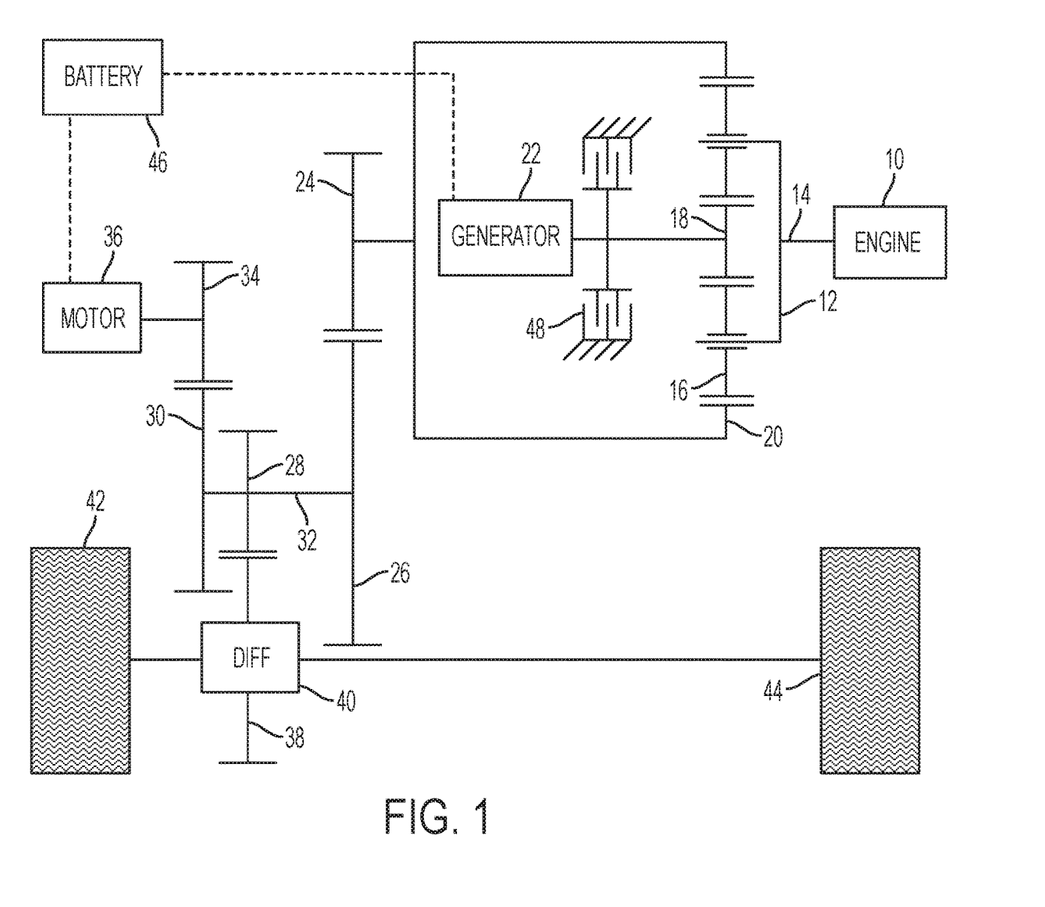
FIG. 1 is a schematic diagram of a first gearing arrangement for a hybrid electric powertrain.

FIG. 1 schematically illustrates a first kinematic arrangement for a power-split type hybrid electric vehicle. Power is provided by engine 10 which is fixedly coupled to planet carrier 12 via transmission input shaft 14. A set of planet gears 16 are supported for rotation with respect to carrier 12. Sun gear 18 and ring gear 20 are each supported for rotation about the same axis as carrier 12 and each mesh with the planet gears 16. Generator 22 is fixedly coupled to sun gear 18. Layshaft gear 24 is fixedly coupled to ring gear 20 and meshes with layshaft gear 26. Layshaft gear 26 is fixedly coupled to layshaft gears 28 and 30 via shaft 32. Layshaft gear 34 meshes with layshaft gear 30 and is fixedly couple to motor 36. Layshaft gear 28 meshes with layshaft gear 38 which is the input to differential 40. Differential 40 drives wheels 42 and 44 allowing slight speed differences as the vehicle turns a corner.

Generator 22 and motor 36 are both reversible electric machines. The terms generator and motor are used merely as labels. Both machines are capable of converting electrical power to mechanical power or converting mechanical power to electrical power. For example, each machine may be a synchronous motor in combination with a three phase inverter. Both machines are electrically connected to battery 46. In some circumstances, engine 10 may generate more power than is delivered to the vehicle wheels 42 and 44 with the excess power stored in battery 46. In other circumstances, power may flow from battery 46 permitting engine 10 to produce less power than the instantaneous demand of the vehicle. For example, the engine 10 may be off while power to propel the vehicles comes from battery 46.

The powertrain of FIG. 1 can be operated in a continuously variable mode with battery 46 neither providing nor absorbing power. The torque applied to generator 22 and the torque applied to layshaft gear 24 are both related to the torque generated by engine 10 based on the number of teeth on sun gear 18 and the number of teeth on ring gear 20. Specifically, $$T_{gen} = \frac{N_{sun}}{N_{sun} + N_{ring}} T_{eng}$$

$$T_{gear24} = \frac{N_{ring}}{N_{sun} + N_{ring}} T_{eng}$$

where $T_{eng}$ is the torque generated by engine 10, $T_{gen}$ is the torque absorbed by the generator 22, $T_{gear24}$ is the torque absorbed by gear 24, $N_{sun}$ is the number of teeth on sun gear 18, and $N_{ring}$ is the number of teeth on ring gear 20. The engine speed is a weighted average of the generator speed and the speed of gear 24.

$$\omega_{eng} = \frac{N_{sun}}{N_{sun} + N_{ring}} \omega_{gen} + \frac{N_{ring}}{N_{sun} + N_{ring}} \omega_{gear24}$$

When the vehicle is moving slowly, gear 24 rotates slowly and generator 22 rotates faster than engine 10. Power generated by the engine is split by the planetary gear set. A portion of the power is transmitted mechanically to shaft 32 from carrier 14 to ring gear 20 to gear 24 to gear 26. The remaining power is transmitted from sun 18 to generator 22 which converts the power to electrical power. Motor 36 converts the electrical power to mechanical power which is transmitted to shaft 32 by gear 34 and 30. Although both power transfer paths are subject to some parasitic losses, conversions between electrical power and mechanical power typically involve more power loss than purely mechanical transfer. As the ratio of the speed of shaft 32 to the speed of engine 10 increases, a point is reached at which generator 22 is stationary. At this ratio, all of the power is transferred mechanically. At higher overdrive ratios, generator 22 rotates in the opposite direction as engine 10 and acts as a motor. Power circulates from generator 22 through the mechanical power flow path to shaft 32, through gears 30 and 34 to motor 36 which acts as a generator. The parasitic losses associated with the circulation of power tend to make operation at overdrive ratios inefficient.

Even at the overdrive speed ratio at which no the generator is stationary, the electrical power flow path still incurs parasitic losses, because some electrical power is required to produce the necessary reaction torque on sun gear 18. To improve efficiency in this operating condition, the powertrain of FIG. 1 includes overdrive brake 48. When overdrive brake 48 is engaged, the brake provides the necessary reaction torque at sun gear 18, thereby eliminating all parasitic losses associated with the electrical power flow path. Due to the unique nature of this powertrain, an electrically actuated brake is more suitable than a hydraulically actuated clutch.

Figure 2:
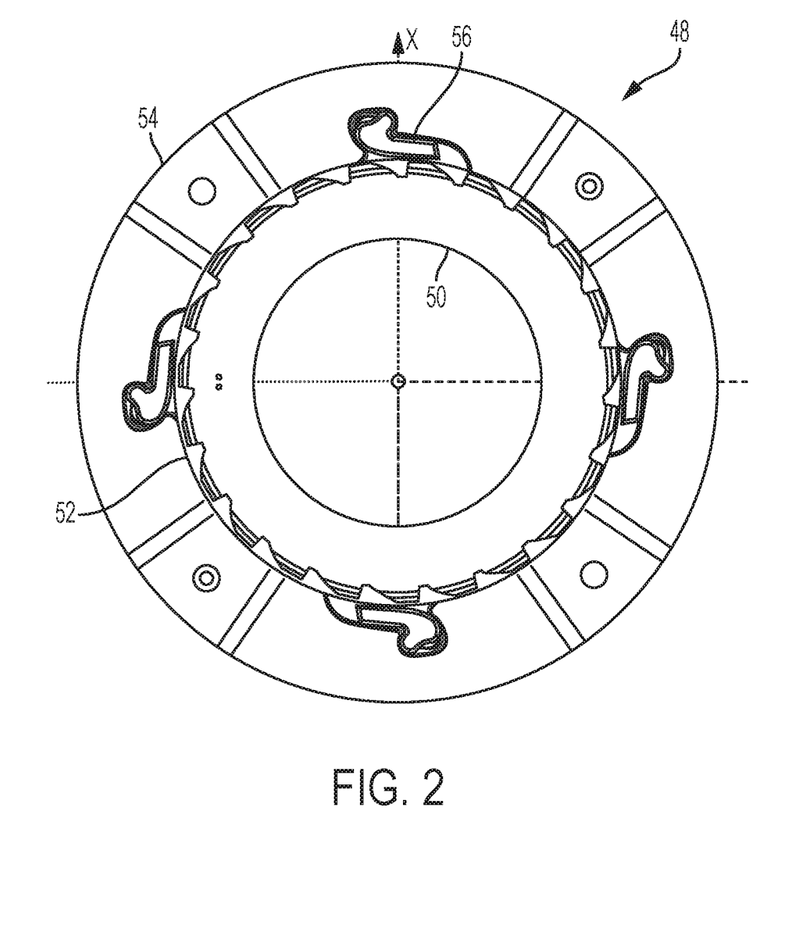
FIG. 2 is a cross sectional end view of a one-way clutch suitable for use in the gearing arrangement of FIG. 1.

FIG. 2 is an end view of part of brake 48. The inner race 50 is held stationary by the transmission case. The outer perimeter of inner race 50 includes teeth 52. The outer race 54 is fixed to the rotor of generator 22 and sun gear 18. Several pawls 56 are supported within pockets in outer race 54 for rotation therewith. When the pawls are within the pockets, as shown in FIG. 2, outer race 54 is free to rotate in either direction. When the pawls pivot inwards, they engage the teeth 52 of the inner race 50. The teeth are shaped to push the pawls back toward the pockets in response to clockwise rotation of outer race 54. However, the pawls engage the teeth in a manner that prevents clockwise rotation of outer race 54.

Figure 3:
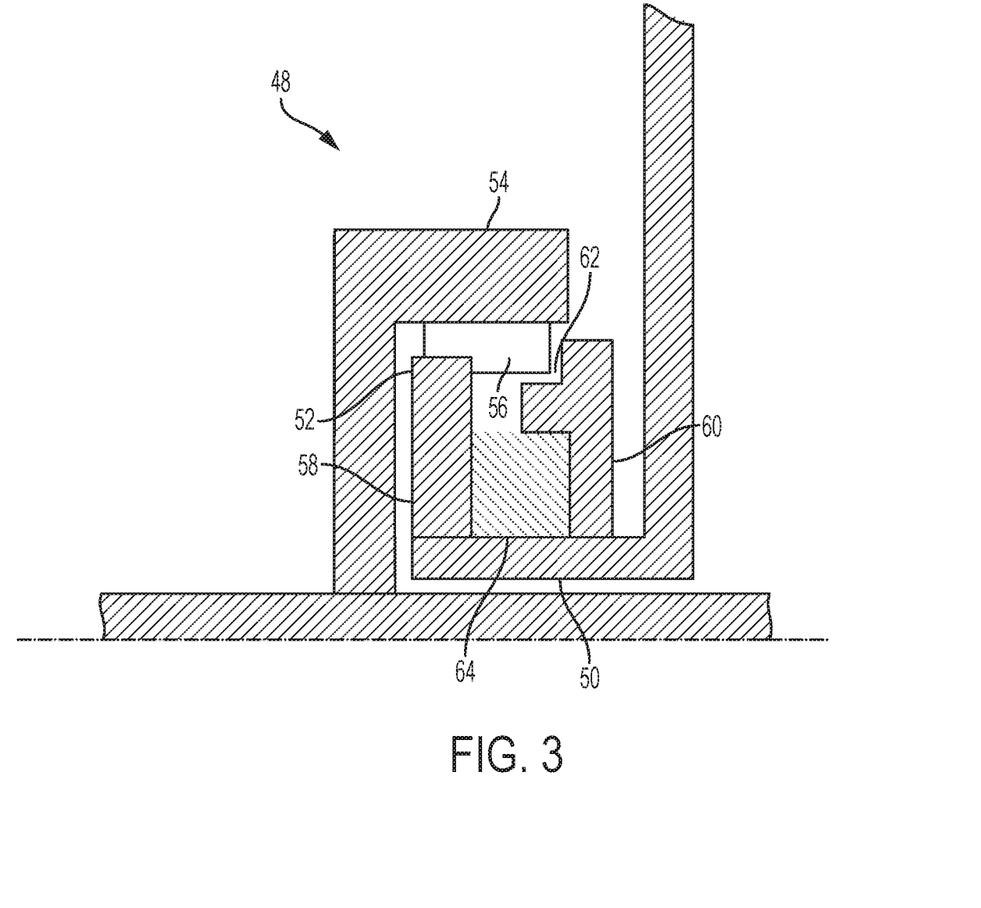
FIG. 3 is a cross section side view of an electro-magnetically actuated brake suitable for use in the gearing arrangement of FIG. 1.

FIG. 3 is a cross sectional view of brake 48. Only the portion above the centerline is shown. Two plates, 58 and 60, are splined onto inner race 50. Alternatively, one or both plates may be integrally formed with inner race 50. Plate 58 includes the teeth 52. Plate 60 does not have teeth. In FIG. 3, the pawls 56 are shown in the engaged position, contacting the teeth 52. Plate 60 is separated from the outer race 54 by a small air gap 62. Specifically, air gap 62 separates plate 60 from the sides of the pawls 56. A coil 64 is formed between plates 58 and 60. The coil includes electrically conductive wire wound circumferentially. The ends of the wire are connected to a controller. Since inner race 50 is stationary, no brushes or other means are required to transmit the electrical current to coil 64.

Inner race 50, plates 58 and 60, and the pawls 56 are made of a magnetically conductive material. When the controller sends an electrical current through coil 64, a magnetic circuit is established running from race 50, through plate 60, across air gap 62, through pawl 56, across an air gap to the teeth 52 of plate 58, and back to inner race 50. The magnetic circuit causes magnetic forces across the air gaps. The magnetic forces cause pawls 56 to pivot into engagement with the teeth 52. As the pawls contact the teeth, one of the air gaps is eliminated. This reduces the magnetic resistance and thereby reduces the current required to maintain a certain level of magnetic flux. In this state, brake 48 prevents forward rotation of sun gear 18, thereby providing the reaction force for the overdrive ratio.

Figure 4:
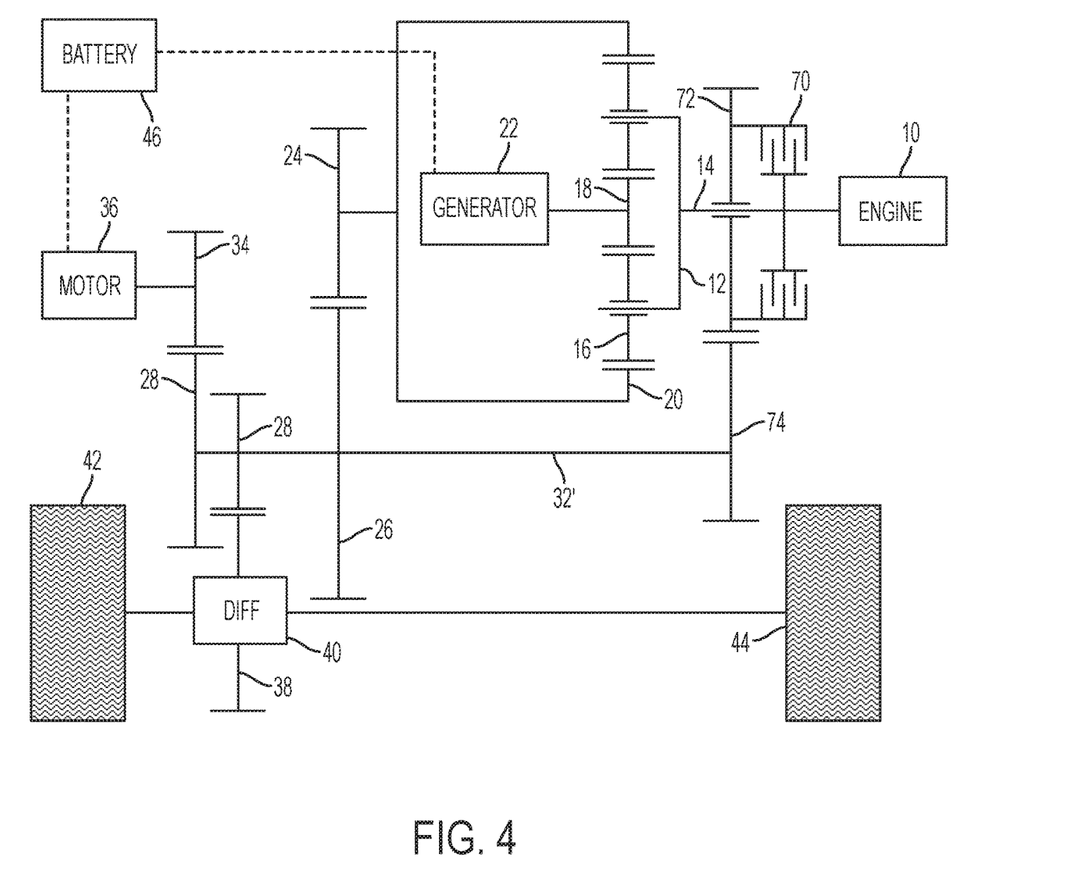
FIG. 4 is a schematic diagram of a second gearing arrangement for a hybrid electric powertrain.

FIG. 4 schematically illustrates a second kinematic arrangement for a power-split type hybrid electric vehicle. Analogous components to those of FIG. 1 are labelled with the same reference number. In operating conditions other than the mechanical overdrive mode, the powertrain of FIG. 4 operates the same as the powertrain of FIG. 1. The powertrain of FIG. 4 includes a clutch 70 for establishing a fixed mechanical overdrive ratio. When clutch 70 is engaged, power is transferred from shaft 14 via clutch 70 to gear 72. Gear 72 meshes with gear 74 which is fixedly coupled to shaft 32'. A designer can adjust the overdrive ratio of the powertrain of FIG. 4 by adjusting the relative pitch diameters of gears 72 and 74, independently of the pitch diameters of the planetary gears. However, since both components that are selectively coupled by clutch 70 are rotating components, the structure of brake 48 would not work without modification.

Figure 5:
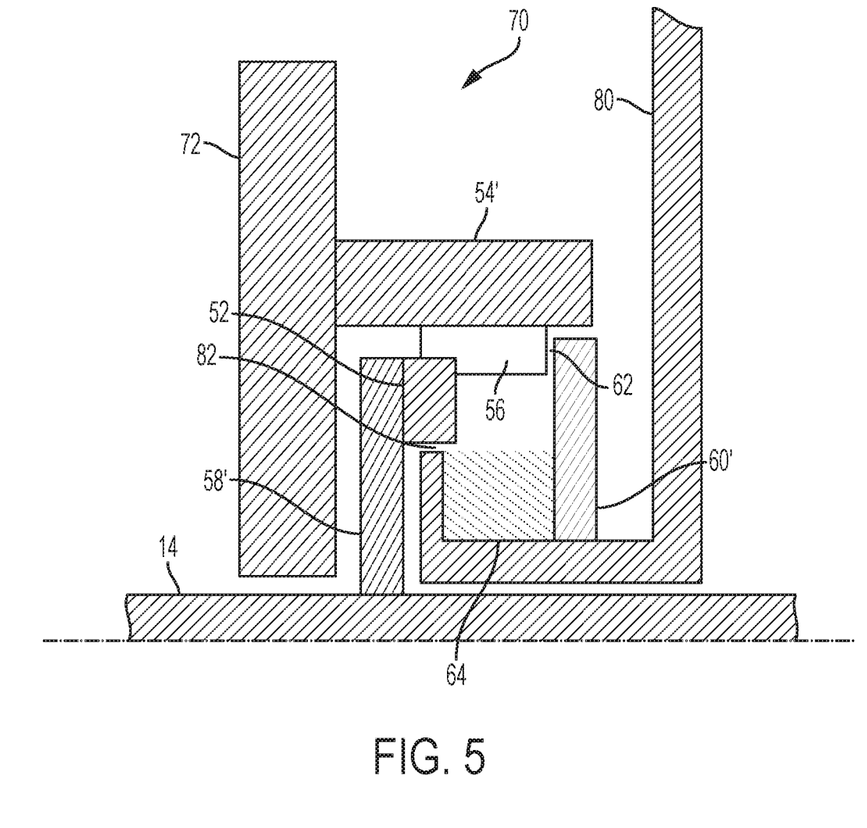
FIG. 5 is a cross section side view of an electro-magnetically actuated clutch suitable for use in the gearing arrangement of FIG. 4.

FIG. 5 is a cross sectional view of clutch 70. Only the portion above the centerline is shown. Plate 60', which does not have teeth, is splined onto stationary member 80. Plate 58', which has teeth, is splined onto input shaft 14. Outer race 54' is fixed to gear 72. In FIG. 5, the pawls 56 are shown in the engaged position, contacting the teeth 52. Plate 60 is separated from the outer race 54 by a small air gap 62. Specifically, air gap 62 separates plate 60 from the sides of the pawls 56. A second air gap 82 separates stationary member 80 from plate 58'. Coil 64 is formed on stationary member 80. The coil includes electrically conductive wire wound circumferentially. The ends of the wire are connected to a controller. No brushes or other means are required to transmit the electrical current to coil 64.

Stationary member 80, plates 58' and 60', and the pawls 56 are made of a magnetically conductive material. When the controller sends an electrical current through coil 64, a magnetic circuit is established running from stationary member 80, through plate 60', across air gap 62, through pawl 56, across an air gap to the teeth 52 of plate 58', and then across air gap 82 back to stationary member 80. The magnetic circuit causes magnetic forces across the air gaps. The magnetic forces cause pawls 56 to pivot into engagement with the teeth 52. As the pawls contact the teeth, one of the air gaps is eliminated. This reduces the magnetic resistance and thereby reduces the current required to maintain a certain level of magnetic flux. In this state, clutch 70 prevents relative rotation in one direction between shaft 14 and gear 72, thereby establishing an overdrive power path.

Figure 6:
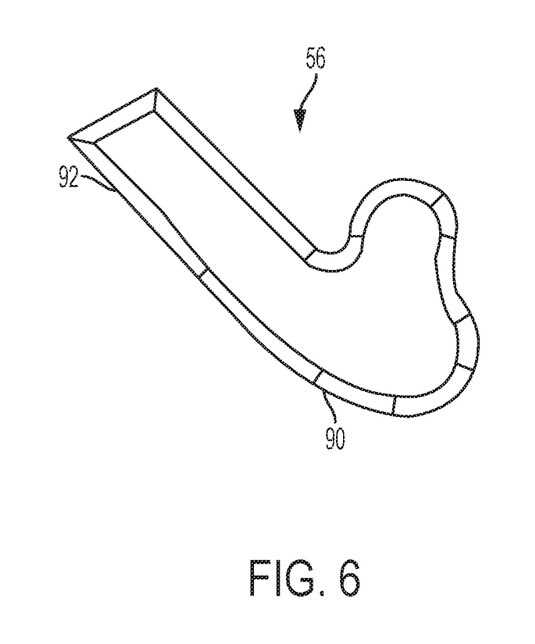
FIG. 6 is a cross sectional end view of one of the pawls of the one-way clutch of FIG. 2 adapted for use with the electro-magnetic actuation of FIGS. 3 and 5.

FIG. 6 shows a cross section of one of the pawls 56. The surface that faces the teeth includes a convex portion 90 and a concave portion 92. The concave portion improves magnetic performance because the air gap between the pawl and a tooth remains small as the tooth passes this portion.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. An electro-magnetically actuated clutch comprising:
    a toothed plate;
    a race supported for rotation relative to the toothed plate and including a plurality of pivotable pawls;
    a stationary, non-toothed plate separated from the race by an air gap; and
    a stationary coil configured to establish a magnetic circuit through the stationary plate, the pawls, and the toothed plate thereby attracting the pawls into engagement with the toothed plate to restrain relative rotation.

2. The electro-magnetically actuated clutch of claim 1 wherein the pawls remain separated from the stationary, non-toothed plate by the air gap when they pivot into engagement with the toothed plate.

3. The electro-magnetically actuated clutch of claim 2 wherein a distance separating the stationary, non-toothed plate from the race remains constant as the pawls pivot.

4. The electro-magnetically actuated clutch of claim 3 wherein the air gap separates the stationary, non-toothed plate from the race in a direction parallel to a pivot axis of the pawls.

5. The electro-magnetically actuated clutch of claim 1 wherein the toothed plate is stationary.

6. The electro-magnetically actuated clutch of claim 1 wherein the toothed plate is supported for rotation.

7. The electro-magnetically actuated clutch of claim 1 wherein the pawls engage the toothed plate to prevent relative rotation in one direction but permit relative rotation in an opposite direction.

8. The electro-magnetically actuated clutch of claim 7 wherein a surface of each of the pawls facing the toothed plate is concave.

9. The electro-magnetically actuated clutch of claim 1 wherein the race is radially outside the toothed plate.

10. An electro-magnetically actuated clutch comprising:
a toothed plate;
a race supported for rotation relative to the toothed plate and including a plurality of pivotable pawls;
a stationary, non-toothed plate separated from the race by a fixed air gap; and
a stationary coil configured to establish a magnetic circuit through the stationary plate, the pawls, and the toothed plate to attract the pawls into engagement with the toothed plate to restrain relative rotation.

11. The electro-magnetically actuated clutch of claim 10 wherein the toothed plate is stationary.

12. The electro-magnetically actuated clutch of claim 10 wherein the toothed plate is supported for rotation.

13. The electro-magnetically actuated clutch of claim 10 wherein the pawls engage the toothed plate to prevent relative rotation in one direction but permit relative rotation in an opposite direction.

14. The electro-magnetically actuated clutch of claim 13 wherein a surface of each of the pawls facing the toothed plate is concave.

15. The electro-magnetically actuated clutch of claim 10 wherein the race is radially outside the toothed plate.

16. An electro-magnetically actuated brake comprising:
a stationary inner race including a toothed plate, a non-toothed plate, and a coil; and
an outer race supported for rotation around the inner race and including a plurality of pivotable pawls;
wherein the coil is configured to establish a magnetic circuit through the non-toothed plate, the pawls, and the toothed plate to attract the pawls into engagement with the toothed plate to restrain rotation of the outer race.

17. The electro-magnetically actuated brake of claim 16 wherein the pawls engage the toothed plate to prevent relative rotation in one direction hut permit relative rotation in an opposite direction.

18. The electro-magnetically actuated brake of claim 17 wherein a surface of each of the pawls facing the toothed plate is concave.

* * * * *